(12) United States Patent
Shoufan et al.

(10) Patent No.: US 11,974,021 B2
(45) Date of Patent: Apr. 30, 2024

(54) ENDORSEMENT SYSTEM AND TECHNIQUES FOR EDUCATIONAL CONTENT

(71) Applicant: Khalifa University of Science and Technology, Abu Dhabi (AE)

(72) Inventors: Abdulhadi Shoufan, Abu Dhabi (AE); Fatma Omar Mohamed Mohamed, Abu Dhabi (AE); Ernesto Damiani, Abu Dhabi (AE)

(73) Assignee: Khalifa University of Science and Technology, Abu Dhabi (AE)

( * ) Notice: Subject to any disclaimer, the term of this patent is extended or adjusted under 35 U.S.C. 154(b) by 0 days.

(21) Appl. No.: 17/995,984

(22) PCT Filed: Apr. 13, 2021

(86) PCT No.: PCT/IB2021/053048
§ 371 (c)(1),
(2) Date: Oct. 11, 2022

(87) PCT Pub. No.: WO2021/209901
PCT Pub. Date: Oct. 21, 2021

(65) Prior Publication Data
US 2023/0217080 A1 Jul. 6, 2023

Related U.S. Application Data

(60) Provisional application No. 63/010,257, filed on Apr. 15, 2020.

(51) Int. Cl.
*H04N 21/482* (2011.01)
*H04N 21/466* (2011.01)
*H04N 21/475* (2011.01)

(52) U.S. Cl.
CPC ..... *H04N 21/4826* (2013.01); *H04N 21/4668* (2013.01); *H04N 21/4756* (2013.01); *H04N 21/4828* (2013.01)

(58) Field of Classification Search
CPC .......... H04N 21/4826; H04N 21/4668; H04N 21/4756; H04N 21/4828
See application file for complete search history.

(56) References Cited

U.S. PATENT DOCUMENTS

D311,523 S    10/1990  Cheung
5,219,291 A    6/1993  Fong
(Continued)

OTHER PUBLICATIONS

Aydin et al., "Quality of Information Available on YouTube Videos Pertaining to Thyroid Cancer", Journal of Cancer Education, Mar. 5, 2019, 7 pages.
(Continued)

*Primary Examiner* — Mulugeta Mengesha
(74) *Attorney, Agent, or Firm* — Kilpatrick Townsend & Stockton LLP

(57) ABSTRACT

This disclosure includes systems and techniques that verify an educational quality of online videos, employing a platform that enables experts to endorse and/or recommend videos that are more readily accessible to end users. Certain aspects include a computing device for a service provider that receives a query from a user for video content. The computing device forwards the query to a hosting service, and in response to the query, the computing device receives, from the hosting service, a list of video content items it hosts. The computing device identifies, for each video content item within the list of video content items, an endorsement value associated with one or more experts. In some aspects, the computing device generates an aggregated list of video content items from a plurality of lists of video
(Continued)

content items based on endorsement values. The computing device provides recommendations to the user using the endorsement values.

20 Claims, 4 Drawing Sheets

(56) References Cited

U.S. PATENT DOCUMENTS

| | | | |
|---|---|---|---|
| 7,472,071 B2 | 12/2008 | Marks | |
| 7,617,519 B2 | 11/2009 | Williams | |
| 8,266,098 B2 | 9/2012 | Hu | |
| 8,577,834 B2 | 11/2013 | Chen | |
| 8,712,943 B1 | 4/2014 | Kim | |
| 8,954,503 B2 | 2/2015 | Bosworth | |
| 9,104,751 B2 | 8/2015 | Siamwalla | |
| 9,374,396 B2 | 6/2016 | Borovoy | |
| 9,607,267 B2 | 3/2017 | Lappas | |
| 9,665,972 B2 | 5/2017 | Block | |
| 9,684,713 B2 | 6/2017 | Bhandari | |
| 10,095,773 B1 | 10/2018 | Gilbert | |
| 10,223,424 B2 | 3/2019 | Bahl | |
| 2014/0024009 A1* | 1/2014 | Nealon | G09B 5/12 434/362 |
| 2014/0304074 A1* | 10/2014 | Korte | G06F 16/9535 705/14.54 |
| 2015/0227988 A1 | 8/2015 | Vozdecky | |
| 2015/0302533 A1 | 10/2015 | Thakur | |
| 2015/0363809 A1* | 12/2015 | Purvy | G06Q 30/0214 705/14.16 |
| 2016/0188601 A1 | 6/2016 | Ganesamoorthi et al. | |
| 2017/0220653 A1 | 8/2017 | Korte et al. | |
| 2017/0238056 A1* | 8/2017 | Greene | G06F 16/4387 725/131 |
| 2020/0007937 A1* | 1/2020 | Polatkan | H04N 21/4756 |

OTHER PUBLICATIONS

Bardakci , "Exploring High School Students' Educational Use of YouTube", International Review of Research in Open and Distributed Learning, vol. 20, No. 2, Apr. 2019, pp. 259-278.
Barry et al., "Anatomy Education for the YouTube Generation", Anatomical Sciences Education, vol. 9, No. 1, Jun. 9, 2015, 8 pages.
Bartl , "Youtube Channels, Uploads And Views: a Statistical Analysis of the Past 10 Years", Convergence: the International Journal of Research Into New Media Technologies, vol. 24, No. 1, 2018, pp. 16-32.
Boer et al., "Using Learning Styles and Viewing Styles in Streaming Video", Computers & Education, vol. 56, Issue 3, Apr. 2011, pp. 727-735.
Bohlin et al., "A Conceptual Characterization of Online Videos Explaining Natural Selection", Science And Education, vol. 26, Dec. 2, 2017, pp. 975-999.
Chtouki et al., "The Impact of YouTube Videos on the Student's Learning", International Conference on Information Technology Based Higher Education and Training (ITHET), 2012, 4 pages.
Dwork et al., "Rank Aggregation Methods for the Web", Proceedings on the 10th International Conference, Apr. 2001, pp. 613-622.
Farhadi et al., "Creating a Novel Semantic Video Search Engine Through Enrichment Textual and Temporal Features of Subtitled YouTube Media Fragments", IEEE, 2013, 9 pages.
Fleck et al., "YouTube in the Classroom: Helpful Tips and Student Perceptions", Journal of Effective Teaching, vol. 14, No. 3, 2014, pp. 21-37.
Dyosi, Hattingh, "Understanding the Extent of and Factors Involved in the Use of YouTube as an Informal Learning Tool by 11- to 13-Year-Old Children", First International Conference, ICITL 2018, Aug. 27-30, 2018, 11 pages.
Jackman , "YouTube Usage in the University Classroom: An Argument for its Pedagogical Benefits", IJET, vol. 14, No. 9, 2019, pp. 157-166.
Jaffar , "YouTube: An Emerging Tool in Anatomy Education", Anatomical Sciences Education, vol. 5, No. 3, 2012, pp. 158-164.
Jones et al., "YouTube: Educational Potentials and Pitfalls", Computers in the Schools, vol. 28, Issue 1, Mar. 14, 2011, pp. 78-85.
Klobas et al., "Compulsive Youtube Usage: a Comparison of Use Motivation and Personality Effects", Computers in Human Behavior, vol. 87, Oct. 2018, pp. 129-139.
Kocyigit et al., "Does You Tube Provide High Quality Information? Assessment of Secukinumab Videos", Rheumatology International, vol. 39, May 8, 2019, pp. 1263-1268.
Lee et al., "User Acceptance of Youtube for Procedural Learning: an Extension Of the Technology Acceptance Model", Computers & Education, vol. 61, 2013, pp. 193-208.
Lei et al., "Effect of Metacognitive Strategies and Verbal-imagery Cognitive Style on Biology-based Video Search and Learning Performance", Computers & Education, vol. 87, Sep. 2015, pp. 326-339.
Li et al., "Comparative Study of Rank Aggregation Methods for Partial and Top Ranked Lists in Genomic Applications", Briefings in Bioinformatics, vol. 20, No. 1, Aug. 22, 2017, pp. 178-189.
Lin , "Rank Aggregation Methods", vol. 2, Sep./Oct. 2010, pp. 555-570.
Moghavvemi et al., "Social Media as a Complementary Learning Tool for Teaching and Learning: the Case of Youtube", The International Journal of Management Education, vol. 16, Issue 1, Mar. 2018, pp. 37-42.
Orus et al., "The Effects of Learner-Generated Videos for You tube on Learning Outcomes and Satisfaction", Computers & Education, vol. 95, Apr. 2016, pp. 254-269.
Application No. PCT/IB2021/053048 , International Search Report and the Written Opinion, dated Jul. 20, 2021, 9 pages.
Refaey et al., "The Reliability of Youtube Videos in Patients Education for Glioblastoma Treatment", Journal of Clinical Neuroscience, Jul. 31, 2018, 4 pages.
Rosenthal et al., "Motivations to Seek Science Videos on Youtube: Free-choice Learning in a Connected Society", Online Available At: https://www.researchgate.net/publication/319450035, Sep. 2017, 35 pages.
Salim et al., "An Approach for Exploring a Video via Multimodal Feature Extraction And User Interactions", Journal on Multi modal User Interfaces, vol. 12, Jul. 13, 2018, pp. 285-296.
Schoeffmann et al., "Improving Interactive Known-Item Search in Video with the Keyframe Navigation Tree", Multi Media Modeling: 21st International Conference, Jan. 2015, 12 pages.
Shoufan , "Estimating the Cognitive Value of Youtube's Educational Videos: a Learning Analytics Approach", Computers in Human Behavior, vol. 92, Mar. 2019, pp. 450-458.
Shoufan , "What Motivates University Students to Like or Dislike an Educational Online Video? A Sentimental Framework", Computers & Education, vol. 134, Jun. 2019, pp. 132-144.
Tackett et al., "Medical Education Videos for the World: An Analysis of Viewing Patterns for a YouTube Channel", Academic Medicine, Journal of Association of American Medical College, vol. 93, No. 8, Aug. 2018, 24 pages.
Tan , "Informal Learning on Youtube: Exploring Digital Literacy in Independent Online Learning", Learning, Media and Technology, vol. 28, Issue 4, Apr. 22, 2013, pp. 463-477.
Tan et al., "Open Education Videos in the Classroom: Exploring the Opportunities and Barriers to the Use of Youtube in Teaching Introductory Sociology", ALT-C 2011 Conference Proceedings, 2011, pp. 125-133.
Ten Hove et al., "Like It or Not. What Characterizes YouTube's More Popular Instructional Videos?", Applied Research, vol. 62, No. 1, Feb. 2015, pp. 48-62.
Toolabi et al., "Reliability and Educational Value of Laparoscopic Sleeve Gastrectomy Surgery Videos on YouTube", Obesity Surgery, vol. 29, May 9, 2019, pp. 2806-2813.
Kruse, Veblen, "Music Teaching and Learning Online: Considering Youtube Instructional Videos", Journal of Music Technology and Education, vol. 5, No. 1, May 22, 2012, pp. 77-87.
Waitelonis et al., "Towards Exploratory Video Search Using Linked Data", Multimedia Tools and Applications, vol. 59, Jan. 28, 2011, pp. 645-672.

(56) References Cited

OTHER PUBLICATIONS

Ward et al., "The Quality of YouTube Videos as an Educational Resource for Attention-Deficit/Hyperactivity Disorder", Pediatric Neurology, vol. 103, Apr. 14, 2019, pp. 84-85.

* cited by examiner

ENDORSEMENT SYSTEM AND TECHNIQUES FOR EDUCATIONAL CONTENT

BACKGROUND

Online educational videos have become a vital source of learning and teaching for both formal and informal education. These videos are mostly shared via Video Hosting Services (VHS) like YOUTUBE®. Such services are often structured as social media, where every registered user is capable of uploading videos. However, the enablement of any user to upload videos has led to a high availability of low-quality educational content. The obscurity of the search and recommendation systems of these services frequently leaves users with suboptimal results, often prioritizing the popularity of a video over its veracity. This has created an increasing demand for decision assistance tools that can guide learners through their search for high-quality content.

Certain aspects of the invention address these and other problems, individually and collectively.

BRIEF SUMMARY

The following presents a simplified summary of some aspects of the invention in order to provide a basic understanding of the invention. This summary is not an extensive overview of the invention. It is not intended to identify key/critical elements of the invention or to delineate the scope of the invention. Its sole purpose is to present some aspects of the invention in a simplified form as a prelude to the more detailed description that is presented later.

Techniques described herein are directed to a system and methods which allows experts to verify the educational quality of online videos by endorsement as well as recommendation of videos to users based on this expert endorsement. The system generates an endorsement value for each video, which is stored in metadata for the video and used to sort search results (e.g., a list of video content items) that are presented to a user in response to a query. For the purposes of this disclosure, an "endorsement value" may include any value representative of the degree to which a video has been endorsed by one or more experts. In some aspects, an endorsement value may be an endorsement value that the video has received from experts. In some aspects, an endorsement value may be a ratio or percentage of endorsements received from experts versus a number of experts that have reviewed the video. For example, if 20 experts have reviewed a video and only eight of those experts have endorsed it, then an endorsement value may be 0.4 (8/20).

According to some aspects, the system is conceived as a gateway between users and Video Hosting Services (VHSs). From the perspective of the users, the system includes as a search engine with additional features. For example, the system may include an ability to return only educational content to requesting users. In one example, search terms may correspond to both educational and non-educational content contained within one or more VHSs. The disclosed system can filter out undesirable non-educational content. Further, the system may service a query for content contained within multiple VHSs simultaneously. For instance, when a user enters one search query, the system may replicate the search inquiry to all supported VHSs. Additionally, the system can use returned lists from all VHSs, aggregate them into a single list, and rank the videos on this list according to an endorsement value. In another example, the system may allow registered users to request one or more experts' evaluations of selected videos. In such an example, if a user is interested in a specific video which has not been endorsed yet, the user can ask for expert evaluation through the system. The system follows an algorithm to record such requests, forward them to related experts, and notify the users.

In the disclosed system, an expert can review and endorse videos in one of two modes: a natural or an invited mode. In the natural mode, the expert accesses the system to search and watch videos as he would do on any VHS system. However, the expert has additionally the possibility to endorse any video when he feels it is useful to do so. In the invited mode, the system collects users' requests to review some video. When the number of these requests reaches some value, the system invites registered experts in the related field of expertise to review the video.

A deployment of at least one exemplary aspect of the system might take place in stages. For example, stages of the system may include: (1) building a seed (e.g., a library) of endorsed videos; and (2) opening the system for normal users.

In stage 1, a network of experts will be built and registered in the system. The experts may access the system to search for and to watch educational videos. When doing this, those experts would endorse videos in a natural mode. Once the network of experts has grown to a suitable size and/or the endorsement value for videos has reached some threshold value, stage 2 would be executed, opening the system for non-expert users. Upon deploying certain aspects of the disclosed system, two main challenges will need to be addressed. First, a system scalability to support millions of users and millions of requests per day. Second, support of VHS providers in terms of the provisioning of required application programming interfaces (APIs) and the permission to query their systems through these APIs at the required scale.

Certain aspects of this disclosure are directed to a service computing device that includes a processor, and a memory including instructions that, when executed with the processor, cause the service computing device to perform a series of steps. In this series of steps, the service computing device is caused to receive a query from a user for video content; forward the query to one or more video hosting services; receive, from the one or more video hosting services, one or more lists of video content items hosted by the one or more video hosting services, the one or more lists responsive to the query; identify, for each video content item within the one or more lists of video content, an endorsement value associated with experts; generate an aggregated list of video content items from the one or more lists of video content items, the aggregated list of video content items being sorted based on the endorsement value; and provide the aggregated list of video content items to the user.

Some aspects of this disclosure are directed to a method that includes receiving a query from a user for video content; forwarding the query to one or more video hosting services; receiving, from the one or more video hosting services, one or more lists of video content items hosted by the video hosting services, the one or more lists responsive to the query; identifying, for each video content item of the one or more lists of video content items, an endorsement value associated with experts; generating an aggregated list of video content items from the one or more lists of video content items, the aggregated list of video content items being sorted based on the endorsement value; and providing the aggregated list of video content items to the user.

Other aspects of this disclosure include a method that includes receiving, from one or more users, an indication of a video content item and a review request for the video content item; determining, based on a category associated with the video content, a number of experts to review the video content item; providing, via contact information stored in relation to the number of experts, a request to review the video content to the number of experts, receiving, from at least a portion of the number of experts, an endorsement of the video content item; and providing a notification of the endorsement of the video content item to the one or more users.

For a fuller understanding of the nature and advantages of the present invention, reference should be made to the ensuing detailed description and accompanying drawings.

BRIEF DESCRIPTION OF THE DRAWINGS

Various aspects of the present disclosure will be described with reference to the drawings.

DETAILED DESCRIPTION

In the following description, various aspects of the present invention will be described. For purposes of explanation, specific configurations and details are set forth in order to provide a thorough understanding of the aspects. However, it will also be apparent to one skilled in the art that the present invention may be practiced without the specific details. Furthermore, well-known features may be omitted or simplified in order to avoid obscuring certain aspects described herein.

In certain aspects of the proposed system, a service computing device (e.g., a computing device that includes a recommendation or endorsement system) forwards a search query submitted by a user to multiple online video hosting services (VHSs) and receives, as a response from each of the multiple VHSs, a video list that contains all videos matching the search keywords. The service computing device then displays to the user an aggregated video list, which is ranked and ordered based on one or more experts' endorsements, where the most endorsed videos are on the top. In some aspects, this requires a quick check against the system's database to identify the endorsed videos amongst the returned lists. In other aspects, once the user selects the video that he or she wants to view, the service computing device sends a specific request to render the selected video from its original VHS within the current system. Note that certain aspects of the disclosed system may not store videos, rather they may store metadata associated with those videos as well as all search queries (for future system enhancements).

Figure 1:
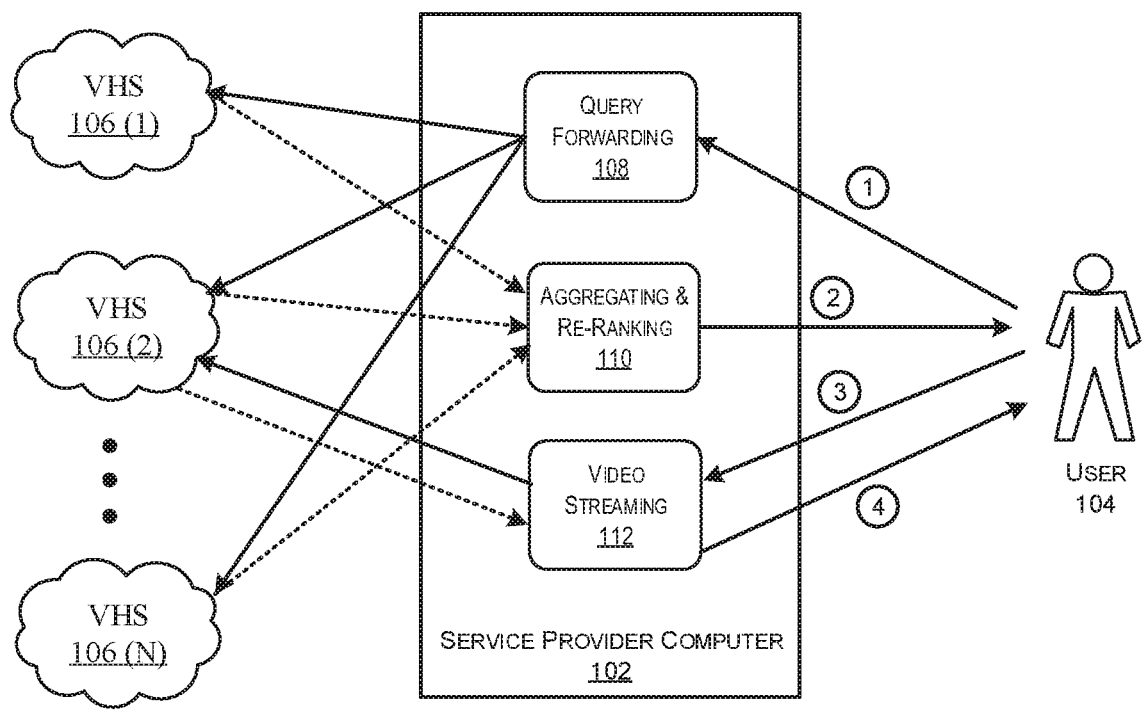
FIG. 1 depicts an illustrative example of an endorsement and recommendation system that may be implemented in accordance with at least some aspects.

FIG. 1 depicts an illustrative example of an endorsement and recommendation system 100 that may be implemented in accordance with at least some aspects.

In some aspects, the system architecture 100 encompasses a service computing device 102 having three interrelated layers as depicted in FIG. 1. In FIG. 1, user 104 may include any type of user interacting directly with a service computing device 102 of the endorsement and recommendation system. These users can be classified into four main categories: admin users, guest users, registered user, and experts. The service computing device 102 of the system may be in communication with a number of video hosting service systems 106 (1–N).

In some aspects, admin users are responsible for inviting experts to join the system 100. The process starts by creating an initial profile page for every expert. When an expert visits his profile for the first time, he or she will be asked to update his or her credentials. In some aspects, functions attributed to admin users may be performed automatically. For example, upon receiving a list of users who have recently passed a certification test, the system may automatically create an initial profile for each user on the list and transmit credentials to each of those users.

Experts are type of registered users. They can view educational videos, request reviews of other experts and view their search and view history. However, the role that distinguishes experts from normal registered users in the system is reviewing and endorsing videos. They can review and endorse videos in two different modes: a natural mode or an invited mode. In the natural mode, the expert accesses the system to search and watch videos as he would do on any VHS system. However, the expert has, additionally, the possibility to endorse any video when she or he feels it is useful to do so. In the invited mode, the system collects users' requests to review a specific video and then invites experts to assess that video. Keeping in mind that experts are not obligated to review or endorse all endorsement requests suggested by the system. However, the more videos the experts endorse, the higher is the badge rewarded to them by the system's rewarding system. Each expert may be associated with a category of expertise in which he or she is an expert. In some aspects, an expert is only able to endorse video content within his or her expertise. When viewing video content items outside of his or her expertise, the expert may be treated as a regular registered viewer.

Guest users are users who use the system for the limited purpose of searching and viewing endorsed educational videos. Guest users may not be registered with the system. On the other hand, registered users are the users who are registered with the system to get benefit of its extended functionalities. Registered users have the advantage of requesting experts' reviews to specific videos over guest users. This means that a registered user can request to review a certain video that has never been reviewed by experts in the system. To do so, the user must categorize the video first before submitting an endorsement request. This will support inviting the correct group of experts based on their expertise to review the video.

By way of illustrating interactions between the various components, a process is depicted as being performed by those components. In this process, a user 104 may, at step 1, submit a query to the service computing device 102 for video content. A query forwarding module 108 may, upon receiving the query, forward the query submitted by the user to the multiple video hosting services 106. Each of the video hosting services 106 may respond to the query by providing a list of video content items to the service computing device 102.

At step 2 of the illustrative process, the video content items provided by each of the video hosting services 106 provided to the service computing device 102 is received by an aggregating and re-ranking module 110. The aggregating and re-ranking module 110 then aggregates the lists of video content items into a single list of video content items. Each of the videos in the aggregated list may then be sorted. In some aspects, the service computing device 102 may identify metadata stored in association with each of the videos in the aggregated list. The metadata stored in association with each video may indicate an endorsement value provided for the video. In aspects, the aggregated list of videos may be sorted according to an endorsement value associated with each video, such that videos with the highest endorsement value are presented at the top of the aggregated list. The aggregated list may then be provided to the user 104.

At step 3 of the illustrative process, the service computing device 102 may receive a selection of one of the videos from the aggregated list of videos presented to the user 104. The selection may be received by a video streaming module 112 of the service computing device 102.

At step 4 of the illustrative process, the video streaming module 112 of the service computing device 102 retrieves the selected video from the video hosting service which provided it in a list. Once retrieved, the video streaming module 112 then serves the selected video content items to the user 104.

For clarity, a certain number of components are shown in FIG. 1. It is understood, however, that some aspects of the invention may include more than one of each component. In addition, some aspects of the invention may include fewer than or greater than all of the components shown in FIG. 1. In addition, the components in FIG. 1 may communicate via any suitable communication medium (including the Internet), using any suitable communication protocol.

Figure 2:
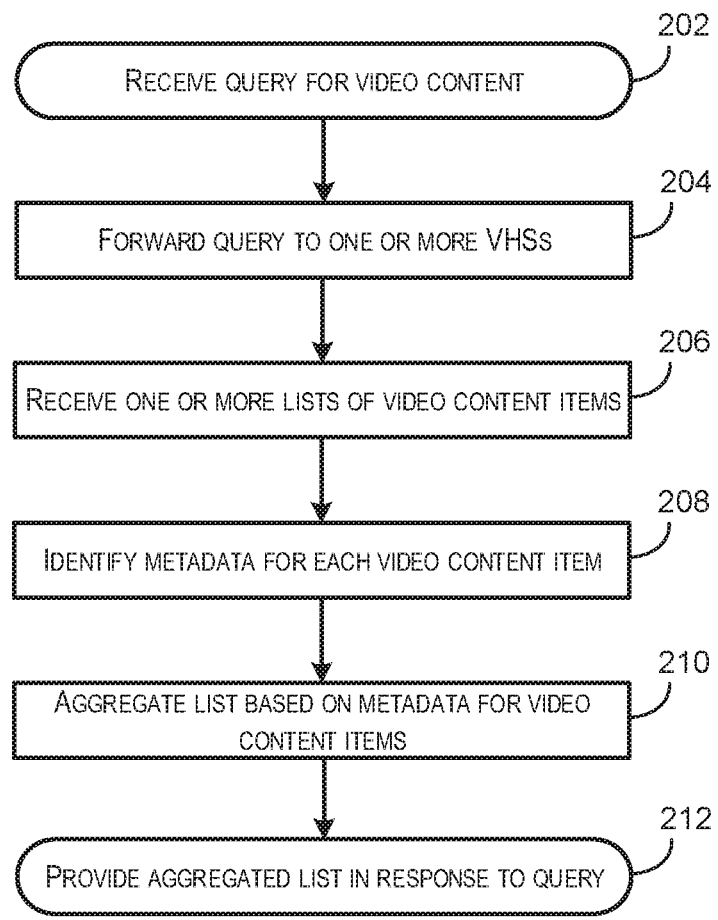
FIG. 2 depicts a process for presenting one or more endorsed video content items to a user in response to a query in accordance with at least some aspects.

FIG. 2 depicts a process for presenting endorsed video content to a user in response to a query in accordance with at least some aspects. Some or all of the process 200 (or any other processes described herein, or variations and/or combinations thereof) may be performed under the control of one or more computer systems (e.g., computing devices) having executable instructions and may be implemented as code (e.g., executable instructions, one or more computer programs or one or more applications). In some examples, the process 200 of FIG. 2 may be performed by at least the service computing device 102 shown in FIG. 1. The code may be stored on a computer-readable storage medium, for example, in the form of a computer program including instructions executable by one or more processors. The computer-readable storage medium may be non-transitory.

Process 200 may begin at 202, when a query is received for video content. In some aspects, the query is received from the user via a graphical user interface associated with a software application installed on a user device (e.g., a client device). The software application may be associated with the service computing device 102. For example, the software application may be a browser application capable of accessing a web application maintained by the service computing device 102.

At 204, the process 200 involves forwarding the received query to one or more video hosting services. In some aspects, the service computing device 102 stores a number of application programming interfaces and the query is forwarded to the one or more video hosting services via application programming interfaces associated with the video hosting services.

At 206, the process 200 involves receiving one or more lists of video content items responsive to the query. In some aspects, each video hosting service may separately perform the provided query on video content that it maintains in order to generate a separate list of video content items.

At 208, the process 200 involves identifying metadata for the video content items in the lists of video content items. In some aspects, the metadata includes an endorsement value for the particular video content item, wherein the endorsement value identified for each video content item is associated with a set of experts who reviewed the video content item. In these aspects, each of the endorsements for each video content item is an indication of a veracity of the particular video content item and is associated with the video content item only if the expert is associated with a category or classification of the video content item.

At 210, the process 200 involves aggregating the lists of video content items based on an endorsement value for each of the video content items. For example, the aggregated list of video content items may be sorted in descending order of endorsement value (e.g., from a highest relative endorsement value to a lowest endorsement value). In some examples, the order of the endorsement value may be based on an average endorsement value (e.g., the average endorsement value associated with the set of experts who reviewed the video content item).

At 212, the process 200 involves providing the aggregated list of video content items to the user in response to the query. In some aspects, the aggregated list of video content items is provided on a screen of a user device (e.g., a client device) operated by the user, such that the user is able to select at least one video content item from the aggregated list of video content items.

In some aspects, the process 200 further involves receiving a selection of a video content item from the aggregated list of video content items, retrieving the video content item from at least one video hosting service of the one or more video hosting services, and presenting the video content item to the user.

Figure 3:
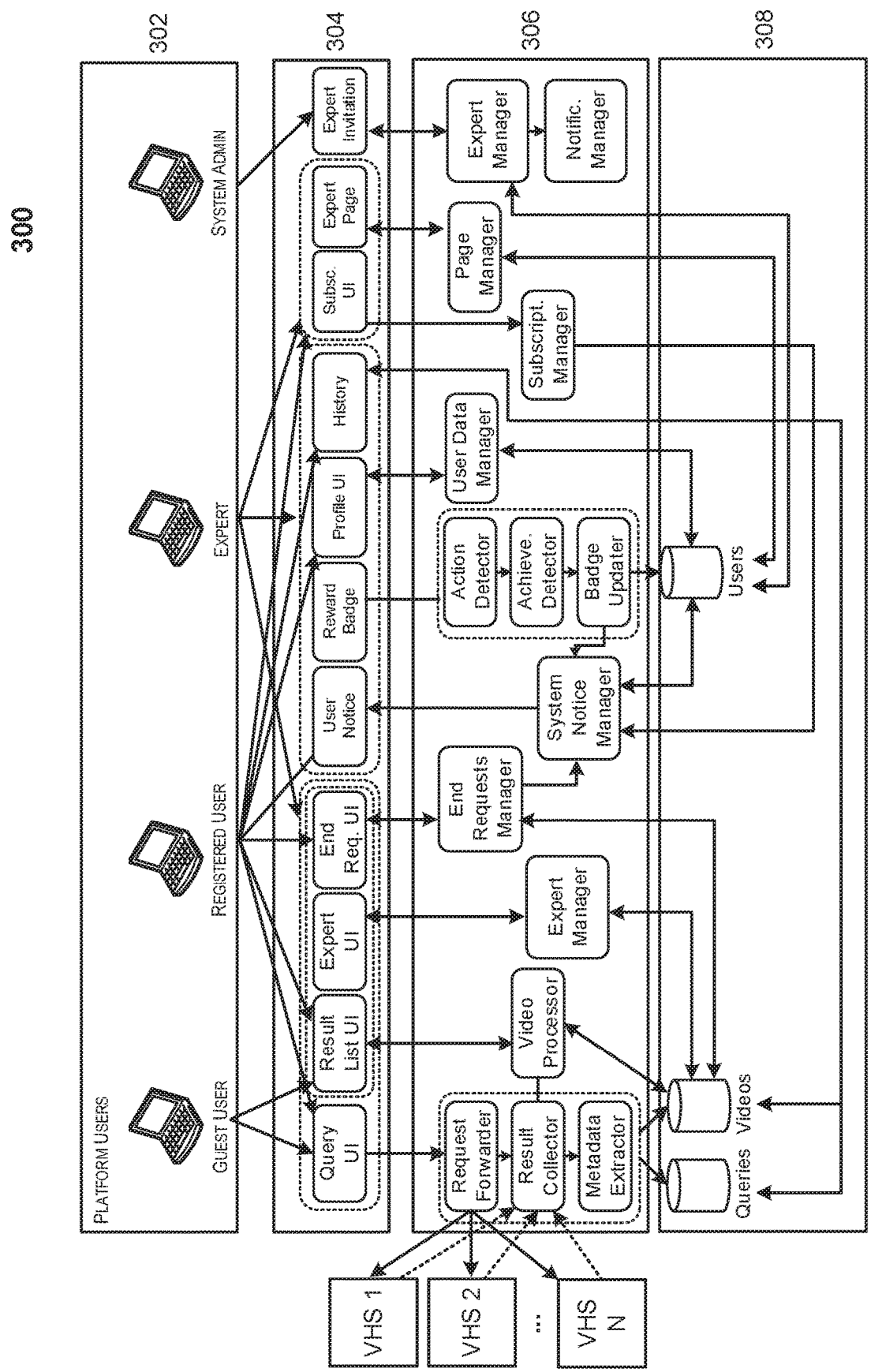
FIG. 3 depicts an illustrative example of a system architecture having a number of exemplary system components that may be implemented in accordance with at least some aspects.

FIG. 3 depicts an illustrative example of a system architecture having a number of exemplary system components that may be implemented in accordance with at least some aspects. The system architecture 300 may be an example of service computing device 102 described with respect to FIG. 1 above. Also depicted in FIG. 3 are a number of interactions between the various components depicted. The system architecture may be made accessible to a number of system users 302. The various components of the system architecture may be implemented across a number of different system layers, including a user interface layer 304, a system management layer 306, and a data layer 308.

As depicted in the illustrated system architecture, each of the four types of users 302 may be provided access to different system components via the user interface layer 304. This may enable varying degrees of access to those users 302 to functionality of the system management layer 306.

Figure 4:
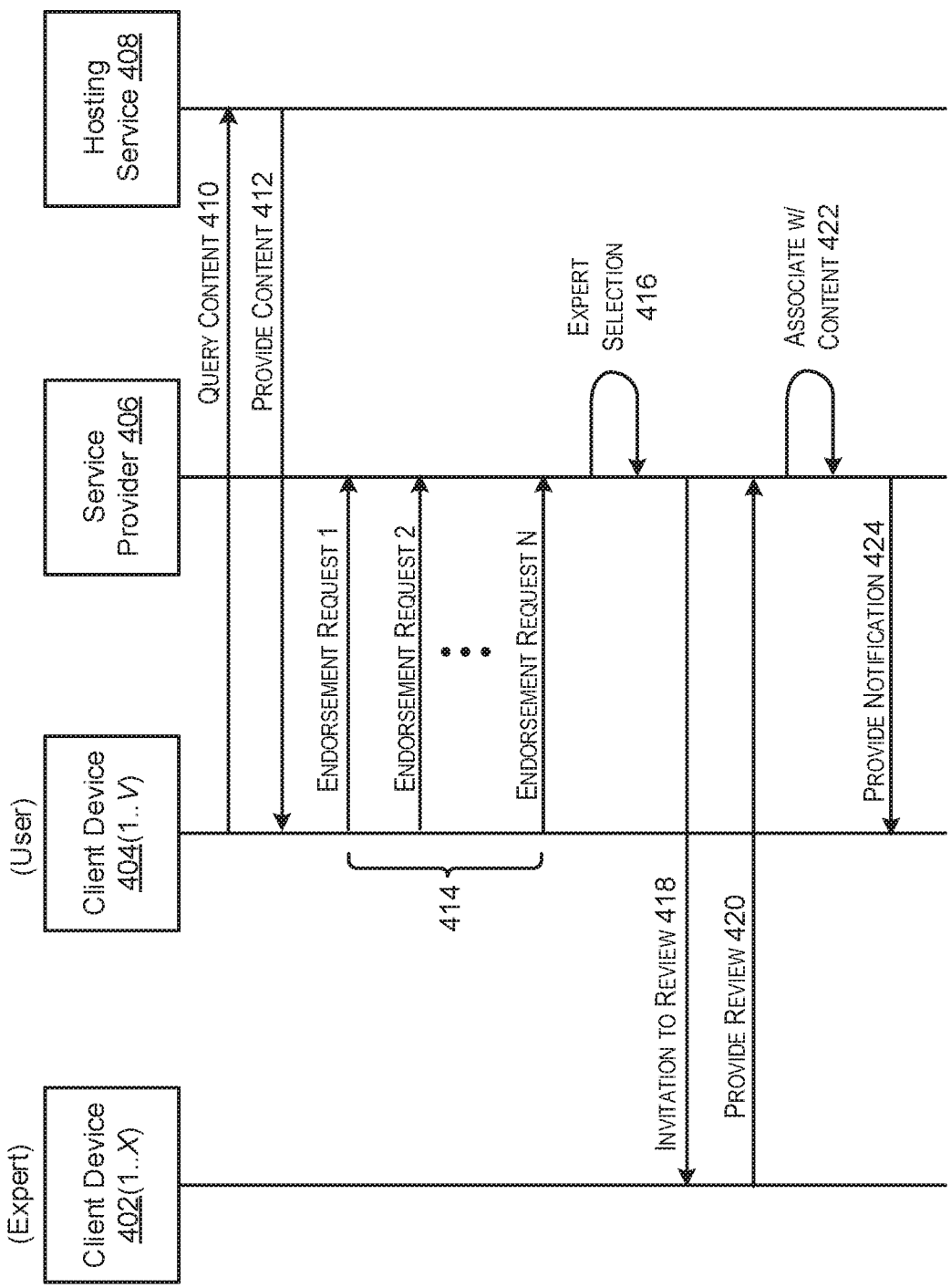
FIG. 4 depicts a swim lane diagram illustrating an example process flow that may be implemented in accordance with at least some aspects.

FIG. 4 depicts a swim lane diagram illustrating an example process flow that may be implemented in accordance with at least some aspects. The depicted process 400 is described with respect to a number of devices, and more particularly, a number of client devices 402 (1-X) operated by experts, a number of client devices 404 (1-V) operated by other users, a service provider 406 (e.g., including a service computing device 102), and a number of hosting service computers 408.

At 410, the process 400 involves a user operating a client device 404 querying video content from a hosting service 408 via a service provider 406. At 412, the hosting service 408 then provides a video or reference to a video in response to the query. In some aspects, the system may store an indication of a link or other reference to a particular video selected via the client device 404 and returned via the query along with a request to have the video endorsed by an expert.

At 414, the user may provide a reference to the video (e.g., a link) to the service provider 406. In some aspects, the service provider 406 may receive multiple endorsement requests from a multitude of different client devices 404. In some aspects, once the service provider 406 receives at least some number N of endorsement requests from a plurality of client devices 404, the service provider 406 may initiate an endorsement process for the video.

At 416, the process 400 involves selecting a number of experts to provide an endorsement for the selected video. In some aspects, the number of experts may be selected based on a category or type of the video. The service provider 406 may select experts which are assigned as experts in the category or type determined for the video. Each expert selected in this way may be associated with contact information such as an email address.

Upon selecting a number of experts, the process 400 involves providing each of the selected experts with an invitation to review the video at 418. Each invitation may be provided to the respective expert via the contact information identified with respect to that expert. The expert may then access the video via the client device 402 that is being operated by the expert. Once the expert has reviewed the video, the expert may provide a review of the video at 420. In some aspects, the review of the video may include an endorsement of the video by the expert. In some aspects, the expert may indicate that the video is unreliable (e.g., provide a negative endorsement).

Once at least one endorsement has been received by at least one of the selected experts, the endorsement is associated with the video content item at 422. In some aspects, the endorsement may be stored as metadata in relation to the video (or a link to the video). The service provider 406 may store an indication of an endorsement value received for each video. In some aspects, the service provider 406 may relate to video content items that are accessible across a number of different hosting services 408. For example, a video hosted on one hosting service 408 may be determined to be the same video as one hosted on a different hosting service 408. In these aspects, the endorsements received with respect to either video may be associated with both videos. To do this, the system may use signature-based copy filtering to filter out repeated (i.e., equivalent) videos hosted by different hosting services. For example, the system may calculate a signature for each video from the video headers and may subsequently compare each header to identify repeated videos.

At 424, once the service provider 406 has received at least one endorsement of a video, the service provider 406 may transmit notifications to each of the users from which an endorsement request was received. The notification may indicate that the video has been endorsed by an expert. In some aspects, the notification may also indicate which experts have endorsed the video.

Certain aspects of the disclosure provide for a number of technical advantages over conventional systems. While expert and non-expert endorsements (In form of up- or down-voting) are frequently used in some systems such as Q&A websites (e.g. Quora), these systems do not provide the advantages of the proposed system. In particular, some aspects of the present disclosure includes a system that enables users to access educational video content items from across a number of systems (e.g., VHSs), for example, while being ensured at least some minimum level of veracity for that content.

A VHS such as YOUTUBE may be used for both formal and informal education. For example, some content on YOUTUBE may reach a global viewership. Further, various genre-like categories may exist on such systems, and educational video content item is among the most popular type of these categories. Some polling indicates that educational video channels are consistently high-ranking among categories such as people & blogs, gaming, music, entertainment, news politics, entertainment, gaming, etc.

The present invention includes improvements over existing systems. Some existing systems previously addressed students' and other Internet users' motivation to watch YOUTUBE's educational videos. While students may use YOUTUBE for entertainment, information seeking, and academic learning, the disclosed system is recommended as a complementary tool for teaching and learning. A perceived usefulness and user satisfaction may be predictors of students' intention to watch YOUTUBE videos for procedural learning. Further, some users' intention to watch science videos may result in users seeking-related subjective norms, an enjoyment of science, and informational uses of YOUTUBE were significant predictors of interest in this system.

Tables

The following tables illustrate some exemplary functional requirements, features, and non-functional requirements of a system as described herein.

TABLE 1

System's Functional Requirements

| Requirement Code | Requirement |
| --- | --- |
| FR1 | The system should allow admin users to send invitations with profile credentials to experts via an email service. |
| FR2 | The system should allow experts to join the experts' network via the username and password they have received via email. |
| FR3 | The System should allow users to register and should let them log in and log out after registration. |
| FR4 | The system should allow all registered users including experts to update/edit their profile information. |
| FR5 | The system should allow all users to search for educational videos. |
| FR6 | The system should filter out non-educational videos. |
| FR7 | The system should forward the user's query to multiple VHSs and aggregate the result. |
| FR8 | The system should rank the aggregated videos by endorsement ratio |
| FR9 | The system should support sorting and filtering the returned videos according to the user's preference. |
| FR10 | The system should render the selected video directly from the respective VHS. |
| FR11 | The system should allow experts to endorse videos. |
| FR12 | The system should allow experts to edit and delete endorsements. |
| FR13 | The system should allow registered users to request expert endorsements to a particular video. |
| FR14 | The system should suggest requested videos to the right experts based on their field of experience. |

TABLE 1-continued

System's Functional Requirements

| Requirement Code | Requirement |
|---|---|
| FR15 | The system should notify related experts by the endorsements requests. |
| FR16 | The system should notify all users who requested video endorsement, when the requested videos get endorsed by at least one expert |
| FR17 | The system should display search and view history to all registered users including experts. |
| FR18 | The system should display endorsement requests history to all registered users including experts. |
| FR19 | The system should display endorsement history to experts users only. |
| FR20 | The system should allow registered users to subscribe to experts' pages. |
| FR21 | The system should assign each expert a rewarding badge based on the number of reviews that he/she contributed to. |

TABLE 2

System's Features

| Feature Code | Feature Name | Admin | Expert | Registered User | Guest User |
|---|---|---|---|---|---|
| FR1 | Create Expert Profile | ✓ | | | |
| FR2 | Edit Expert Profile | ✓ | | | |
| FR3 | Delete Expert Profile | ✓ | | | |
| FR4 | Invite Expert | ✓ | | | |
| FR5 | Register | | | | ✓ |
| FR6 | Verify Email | | ✓ | ✓ | |
| FR7 | Login | ✓ | ✓ | ✓ | |
| FR8 | Logout | ✓ | ✓ | ✓ | |
| FR9 | View Profile | | ✓ | ✓ | |
| FR10 | Edit Profile | | ✓ | ✓ | |
| FR11 | Delete Profile | | ✓ | ✓ | |
| FR12 | Search Videos | | ✓ | ✓ | ✓ |
| FR13 | Sort Results | | ✓ | ✓ | ✓ |
| FR14 | Filter Results | | ✓ | ✓ | ✓ |
| FR15 | View Video | | ✓ | ✓ | |
| FR16 | View Search History | | ✓ | ✓ | |
| FR17 | View Video View History | | ✓ | ✓ | |
| FR18 | Request Endorsement | | ✓ | ✓ | |
| FR19 | Cancel an Endorsement | | ✓ | ✓ | |
| FR20 | View Endorsement Requests | | ✓ | | |
| FR21 | Endorse Video | | ✓ | | |
| FR22 | View Endorsement | | ✓ | | |
| FR23 | View Endorsement History | | ✓ | | |
| FR24 | Edit Endorsement | | ✓ | | |
| FR25 | Delete Endorsement | | ✓ | | |
| FR26 | View Notifications | | ✓ | | |
| FR27 | Subscribe to Expert | | | ✓ | |

TABLE 3

System's Non-Functional Requirements

| | | |
|---|---|---|
| NR1 | Data Availability: User data should be accessible 24/7 | Availability |
| NR2 | System Availability: The System should at least be available X % | |
| NR3 | Learnabillty: Y% of the system users should be able to perform the system tasks successfully without any assistance. | Usability |
| NR4 | Task efficiency: Tasks should be achieved with the minimum number of clicks/navigations. | |
| NR5 | User Friendliness: Interface should be easy to use and navigate | |
| NR6 | Error Tolerance: Error and help messages should be simple to understand and follow. | |
| NR7 | Customization: The user should be able to filter and sort results according to their importance from his perspectives. | |
| NR8 | Fault Mitigation: System faults should be prevented, predicted, detected and tolerated | Reliability |
| NR9 | Robustness: The system should cope with errors during its execution through error handling. | |
| NR10 | Defect Rate: System defect rate should be less than Z failure per K operation hours. | |
| NR11 | Response time: System Should respond in less than M seconds | Performance |
| NR12 | Performance Scalability: The system should maintain the same performance qualities while the system users are expanding vertically and horizontally | Scalability |
| NR13 | Data Scalability: The System databases should be scalable to handle, at the same performance measures, the increasing user requests. | |
| NR14 | Testability: The system includes tests to ensure 100% branch covering. | Testing and |
| NR15 | Maintainability: The system should be easily and efficiently maintained with the maximum availability and reliability. Database content should remain unchanged. | Maintenance |
| NR16 | Extensibility: The system should support adding or upgrading new/existing functionalities. | |
| NR17 | Modularity: The system functionalities should be designed as independent communicating modules. | |
| NR18 | Reusability: System design should support reusability by considering modularity. | |
| NR19 | Confidentiality: Prevent the disclosure of sensitive information by unauthorized users. | Security |
| NR20 | Authentication: Validating the identity of the user accessing the system | |
| NR21 | Authorization: Specifying the correct permissions for a system user based on his category. | |
| NR22 | Integrity: Maintain the consistency and accuracy of data. Data should be prevented from unauthorized modifications. | |
| NR23 | Data Availability: Data should be available whenever needed by authorized users. | |
| NR24 | The system should comply with the existing online video hosting services APIs. | Compliance |

Other variations are within the spirit of the present invention. Thus, while the invention is susceptible to various modifications and alternative constructions, certain illustrated aspects thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate aspects of the invention and does not pose a limitation on the scope of the invention unless otherwise claimed. No language in the specification should be construed as indicating any non-claimed element as essential to the practice of the invention.

Preferred aspects of this invention are described herein, including the best mode known to the inventors for carrying out the invention. Variations of those preferred aspects may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computing device comprising:
   a processor; and
   a memory including instructions that, when executed with the processor, cause the processor to, at least:
   receive a query from a user for video content;
   forward the query to a plurality of video hosting services;
   receive, from the plurality of video hosting services, a plurality of lists of video content items hosted by the video hosting services, the plurality of lists responsive to the query;
   identify, for each video content item of the plurality of lists of video content, an endorsement value associated with experts, wherein the endorsement value comprises an indication of a veracity of each of the video content items;
   generate a list of one or more video content items from the plurality of lists of video content items, the list of one or more video content items being based on the endorsement value; and
   provide the list of one or more video content items to the user.

2. The computing device of claim 1, wherein the instructions further cause the processor to:
   receive a selection of at least one video content item from the list of one or more video content items;
   retrieve the at least one video content item from a video hosting service of the plurality of video hosting services; and
   present the at least one video content item to the user.

3. The computing device of claim 1, wherein the endorsement value identified for each video content item is associated with one or more experts who reviewed the video content item.

4. The computing device of claim 3, wherein each of the endorsements identified for each video content item is associated with the video content item only if the expert is associated with a category of the video content item.

5. The computing device of claim 1, wherein the query is received from the user via a graphical user interface associated with a software application installed on a client device.

6. The computing device of claim 5, wherein the software application is associated with the computing device.

7. A method comprising:
   receiving a query from a user for video content;
   forwarding the query to a plurality of video hosting services;
   receiving, from the plurality of video hosting services, a plurality of lists of video content items hosted by the video hosting services, the plurality of lists responsive to the query;
   identifying, for each video content item of the plurality of lists of video content items, an endorsement value associated with experts, wherein the endorsement value comprises an indication of a veracity of each of the video content items;
   generating an aggregated list of video content items from the plurality of lists of video content items, the aggregated list of video content items being sorted based on the endorsement value; and
   providing the aggregated list of video content items to the user.

8. The method of claim 7, wherein the aggregated list of video content items is sorted in descending order of endorsement value.

9. The method of claim 7, wherein the endorsement value identified for each video content item is stored as metadata that is in association with the video content item.

10. The method of claim 7, wherein the query is forwarded to the plurality of video hosting services via application programming interfaces associated with the video hosting services.

11. A method comprising:
    receiving, from a plurality of users, an indication of a video content item and a review request for the video content item;
    determining, in response to the review request and based on a category associated with the video content item, one or more experts to review the video content item;
    providing, using contact information stored in relation to the one or more experts, a request to review the video content item to the one or more experts;
    receiving, from at least one expert among the one or more experts, an endorsement of the video content item; and
    providing a notification of the endorsement of the video content item to the plurality of users.

12. The method of claim 11, wherein the one or more experts is determined upon receiving a threshold number of review requests from different users.

13. The method of claim 11, wherein the indication of the video content item includes a link to a location of the video content item in a video hosting service.

14. A non-transitory computer-readable medium comprising program code executable by a processor to cause the processor to:
- receive a query from a user for video content;
- forward the query to a plurality of video hosting services;
- receive, from the plurality of video hosting services, a plurality of lists of video content items hosted by the video hosting services, the plurality of lists responsive to the query;
- identify, for each video content item of the plurality of lists of video content items, an endorsement value associated with experts, wherein the endorsement value comprises an indication of a veracity of each of the video content items;
- generate an aggregated list of video content items from the plurality of lists of video content items, the aggregated list of video content items being sorted based on the endorsement value; and
- provide the aggregated list of video content items to the user.

15. The non-transitory computer-readable medium of claim 14, further comprising program code executable by a processor to cause the processor to:
- receive a selection of a video content item from the aggregated list of video content items;
- retrieve the video content item from a video hosting service of the plurality of video hosting services; and
- present the video content item to the user.

16. The non-transitory computer-readable medium of claim 14, wherein the endorsement value identified for each video content item is associated with an expert who reviewed the video content item.

17. The non-transitory computer-readable medium of claim 16, wherein each of the endorsements identified for each video content item is associated with the video content item only if the expert includes an expertise that is associated with a category of the video content item.

18. The non-transitory computer-readable medium of claim 14, wherein the query is received from the user via a graphical user interface associated with a software application installed on a client device.

19. The non-transitory computer-readable medium of claim 18, wherein the software application is associated with a subscription-based service provider.

20. The computing device of claim 1, wherein the veracity of the video content items comprises an accuracy of educational content of the video content items.

* * * * *